July 28, 1936.   A. W. HAYDON   2,049,261
ELECTRIC MOTOR
Filed Aug. 7, 1935   2 Sheets-Sheet 1
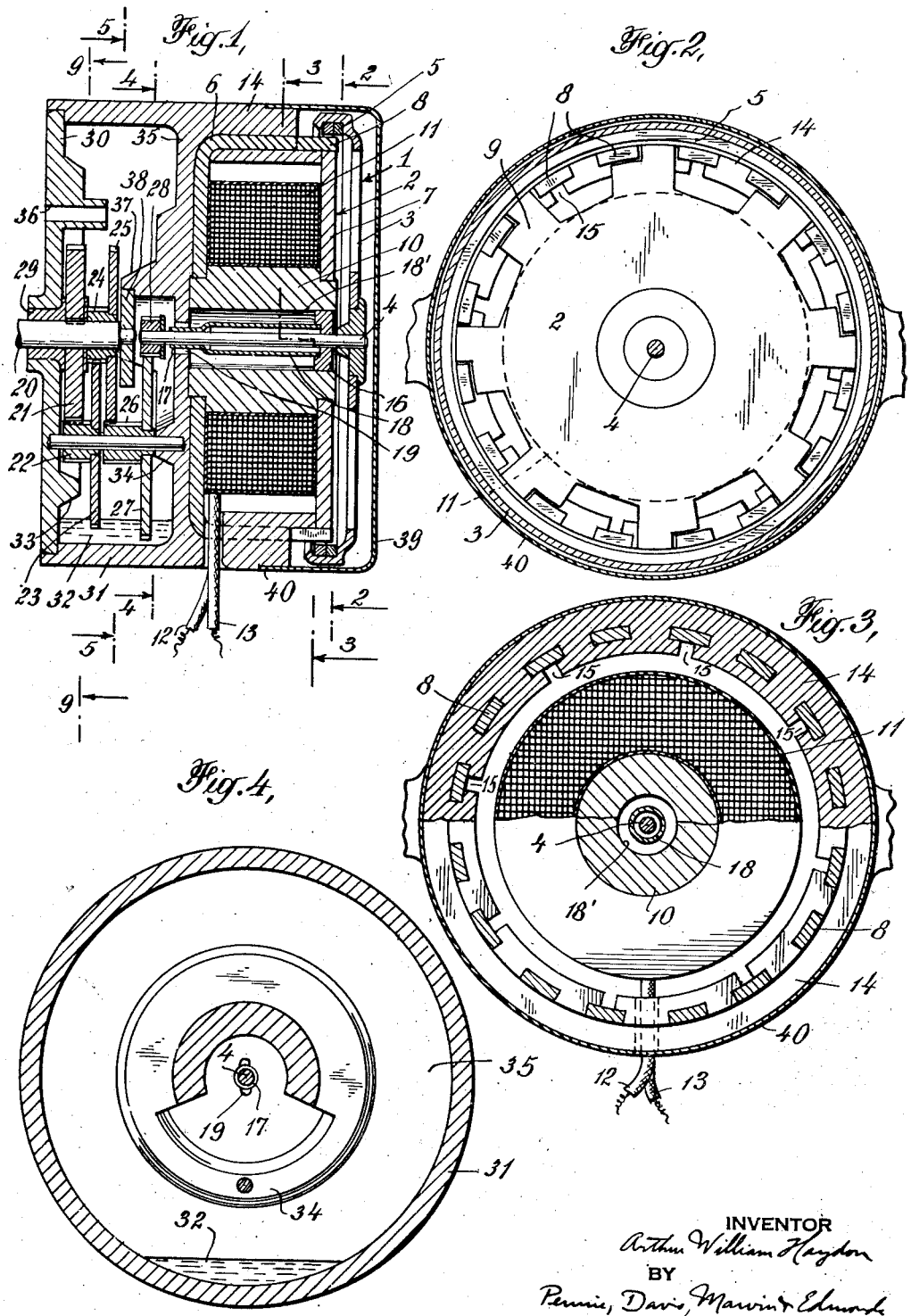
INVENTOR
Arthur William Haydon
BY
Pennie, Davis, Marvin & Edmonds
HIS ATTORNEYS July 28, 1936.  A. W. HAYDON  2,049,261
ELECTRIC MOTOR
Filed Aug. 7, 1935  2 Sheets-Sheet 2
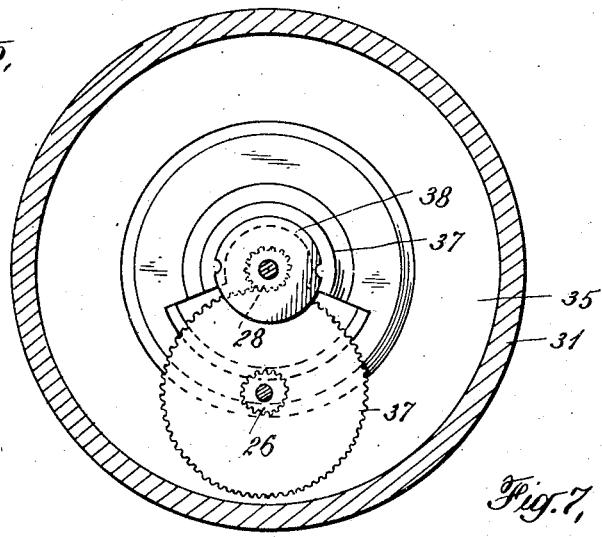
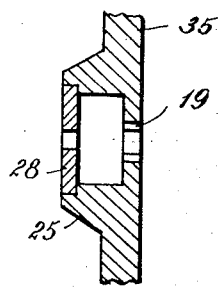
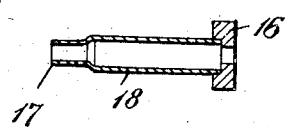
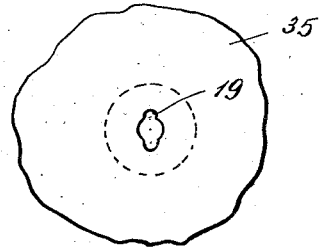
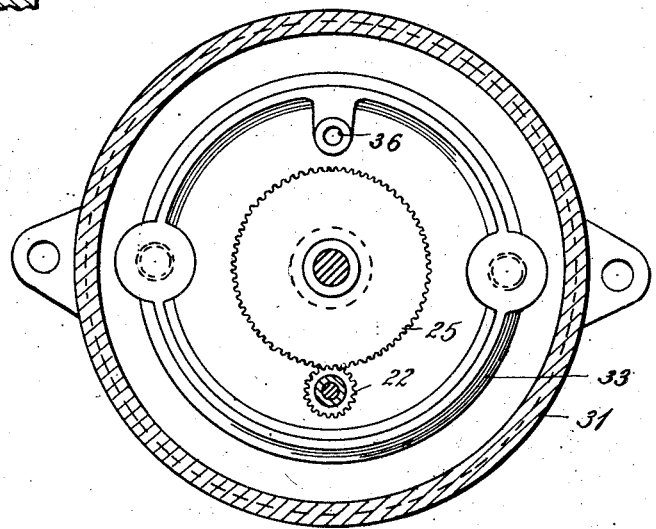
INVENTOR
Arthur William Haydon
BY
Pennie, Davis, Marvin & Edmonds
HIS ATTORNEY Patented July 28, 1936

2,049,261

UNITED STATES PATENT OFFICE 2,049,261

ELECTRIC MOTOR

Arthur William Haydon, Waterbury, Conn.

Application August 7, 1935, Serial No. 35,097

9 Claims. (Cl. 172—275)

This invention relates to electric motors and particularly to single phase self-starting motors suitable for operating clock mechanisms and other timing devices. The invention also relates to an improved electric motor and gear train unit, an object of the invention being to provide a unit of this type of compact portions and capable of being manufactured at low cost.

In making self-starting electric motors suitable for driving timing mechanisms it has been proposed heretofore to employ a single magnetizing coil energized by alternating current and to provide shading rings or disks of copper, or the like, on some of the pole pieces to cause the flux in these pole pieces to lag behind the flux in other pole pieces, thus producing a type of rotating magnetic field. One of the objects of the present invention is to provide a self-starting electric motor having improved shading means which produces the desired flux displacement and also supports and reinforces the pole pieces in a very effective manner. A further object is to provide such a shading means having low resistance to the flow of the currents induced therein.

The invention contemplates an improved motor and gear train unit in which the shading means for rendering the motor self-starting is carried by or preferably integral with the gear train housing. The gear train housing and the shading means are preferably in the form of a metal casting in which some of the pole pieces of the motor are firmly embedded. This practically eliminates the vibration of these pole pieces, thus insuring quiet operation of the motor.

The gear housing is preferably sealed so that it will hold a quantity of oil or other lubricant and the gear housing in preferably provided with means for preventing this oil from flowing thru the openings which must be provided in the walls of the gear housing to accommodate the motor shaft and the driven shaft. This may be accomplished by providing raised ribs, or the like, inside the gear housing and extending around the shaft openings so as to prevent the oil from flowing into these openings even though the housing may be turned to one side or the other. The gear housing is also preferably provided with improved means for supporting the gear shafts and for insuring an adequate supply of lubricant to all moving parts of the mechanism. Certain embodiments of my invention may include a cap of metal, or the like, for protecting the rotor of the motor the cap being mounted on or carried by the means for shading certain poles of the motor field structure.

I have illustrated one embodiment of my invention in the accompanying drawings in which Fig. 1 is a longitudinal section view of a motor and gear train unit;

Fig. 2 is a transverse section view, taken on line 2—2 of Fig. 1;

Fig. 3 is another transverse section view, taken on line 3—3 of Fig. 1;

Fig. 4 is a transverse section view, taken on line 4—4 of Fig. 1;

Fig. 5 is a transverse section view of the gear train and housing, taken on line 5—5 of Fig. 1;

Fig. 6 is a fragmentary horizontal section view of a portion of the gear train housing shown in Figs. 1, 3, 4 and 5;

Fig. 7 is an elevation of the portion of the gear train housing shown in Fig. 6;

Fig. 8 is a horizontal section view of the motor shaft bearings, and

Fig. 9 is a transverse section view, taken on line 9—9 of Fig. 1.

In the accompanying drawings the electric motor comprises an armature or rotor 1 and a stator or field structure 2. The rotor 1 comprises a spider 3, preferably of aluminum or other light weight material mounted on a shaft 4 and carrying an active rotor element 5 illustrated as being in the form of a laminated ring. If it is desirable to have the motor operate at synchronous speed the rotor ring 5 is made of a material such as hardened steel, having high hysteresis.

The motor field structure 2 comprises what may be characterized as a pair of field casing sections 6 and 7. The casing section 6 is provided with laterally extending projections 8 forming pole pieces and the casing section 7 is provided with a corresponding number of radial projections forming pole pieces 9 having portions located between and in circumferential alignment with the pole pieces 8. The casing sections 6 and 7 are of magnetizable material such as soft iron and they are mounted on a central core 10 of similar material. The magnetizing coil extends around the central core 10 and is connected to leads 12 and 13 so that it may be supplied with alternating current.

The construction and arrangement of the stator and rotor above described is similar to that disclosed and claimed in my United States Patent No. 1,977,185 and while I prefer to use this construction and arrangement of the pole pieces and the type of rotor above described yet it is to be understood that the present invention is independent of these features and accordingly other rotor structures and field structures may be employed without departing from the scope of my invention.

One feature of my invention embodied in the apparatus illustrated in the accompanying drawings relates to means for shading certain of the stator pole pieces to provide a rotating magnetic field so that the motor will start from rest and come up to its normal running speed whenever the alternating current is supplied to the magnetizing coil. The shading means I have illustrated is in the form of a body of metal 14 cast around the pole pieces 8 of the casing section 6 and preferably extending along the back of this casing section to reinforce the same and to form a portion of the gear train housing hereinafter described. This shading means 14 embeds all of the pole pieces 8 and it extends entirely around alternate pole pieces but not entirely around the intermediate pole pieces. There are gaps in this shading means as shown at 15 in Figs. 2 and 3 which prevent the flow of induced currents around the intermediate pole pieces and accordingly these pole pieces are unshaded. The other pole pieces on the casing section 6 are entirely surrounded by the body of metal constituting the shading means and accordingly the flux in these pole pieces lags behind the flux in the other pole pieces of this casing section and in this manner a rotating field is provided. It will be understood that this rotating field induces magnetic poles in the rotor ring and the rotor is thereby caused to operate. As stated above, if the rotor ring is of hardened steel, or the like, the rotor will operate at a synchronous speed determined by the number of pairs of poles and the frequency of the current supplied to the magnetizing coil.

The mass of metal 14 constituting the shading means is of non-magnetic material. It is preferably of a metal having high conductivity. The shading means has a large cross sectional area and accordingly it provides a low resistance path for the currents induced therein, even though the specific resistance of the metal is not low. It is feasible to use aluminum or preferably an aluminum copper alloy including approximately 10 per cent copper. The cast shading means not only provides a satisfactory low resistance path for the induced currents flowing around the shaded poles but it also serves the useful function of reinforcing all of the pole pieces 8 to prevent vibration of these pole pieces thus insuring quiet operation of the motor. All of the pole pieces 8 may be embedded in this body of cast metal 14, even though it serves to shade only alternate poles as above described.

The motor shaft 4 is mounted in a pair of bearings one of which consists of a disk 16 preferably of porous material such as bronze graphite and the other bearing, shown at 17, is formed in the end of a bearing sleeve 18 extending into a central bore in the core member 10 and mounted in the disk 16 and in the partition 35. The space 18' between the bearing sleeve 18 and the inside of the bore through the core member 10 provides an oil duct communicating with the porous bearing disk 16, and with oil ports 19 in the gear train housing.

The main shaft 20, which may be used for driving clock mechanism or other timing mechanism, is connected to the rotor shaft 4 through a train of gears 21, 22, 23, 24, 25, 26, 27 and 28, the gear 28 being mounted on the rotor shaft. The shaft 20 is mounted in a bearing bushing 29 carried by a housing plate 30 which is preferably sealed against the rear end of a cylindrical gear housing member 31 which is preferably integral with the body of metal 14 which constitutes the shading means for the rotor field structure. Thus the gear train housing may comprise a unitary cast metal body which serves as a shading means for the field structure of the motor as well as a gear train housing.

The gear train housing may contain a small quantity of oil or other lubricant, shown at 32, into which some of the gears (for example gears 23 and 27) dip so that lubricant is continuously supplied to the gear train and to the oil duct extending along the bearing sleeve 18. It is desirable to prevent this body of oil from gaining direct access to the openings in the gear housing required for the power shaft 20 and the motor shaft, and, accordingly, I have provided an annular rib 33 on the inside of the gear housing cover plate 30 and a similar annular rib 34 on the front partition plate 35. These annular ribs prevent the flow of the lubricant toward these protected parts of the gear housing regardless of whether the unit is maintained in an upright position or tilted on either side. The cover plate 30 may be provided with an air vent 36 extending well into the gear train housing so that there is no danger of the lubricant escaping through this opening. This vent also serves as a means for introducing lubricant into the gear train housing when desired.

The inner gear housing plate 35 may also be provided with a projection 37 forming a support for a bearing disk 38 in which the inner end of the power shaft 20 is mounted. The projection 37 may form a hood enclosing the pinion 28 on the motor shaft and serving to collect lubricant and to deliver the same to the oil ports 19 and the lubricant duct 18' extending along the bearing sleeve 18.

In assembling the apparatus shown in the drawings the body of metal constituting the shading means and the rear plate 35 of the gear train housing and the cylindrical outer portion 31 thereof, may be cast around the field casing section 6. Before this is done, the central core 10 is fixed to the casing section 6 and after casting and assembling the magnetizing coil 11 on the core, the other casing section 7 may be secured to the core. The bearing disk 16 and the bearing sleeve 18 may then be inserted in the central opening in the core 10 and the motor shaft carrying the rotor spider and rotor ring may be inserted through these bearings. The gear train may then be assembled in the gear train housing and then the rear cover plate 30 applied to the rear of the gear train housing and sealed to prevent the escape of oil or other lubricant supplied to the housing.

For the purpose of protecting the rotor I may employ an end cap 39 which may be supported by the body of metal 14 constituting the shading means, as shown at 40. This cap prevents dust and other foreign particles from entering the motor and protects the rotor from accidental injury.

It is to be understood that my invention is not limited to the particular embodiments thereof illustrated in the accompanying drawings but includes such modifications as fall within the scope of the appended claims.

I claim:—

1. An electric motor comprising pole pieces, means for magnetizing the pole pieces, a rotor associated with said pole pieces, and shading means for causing the magnetic flux in some of the pole pieces to lag behind the flux in other pole pieces, said shading means comprising a cast metal body embedding some of the pole pieces.

2. An electric motor comprising pole pieces, means for magnetizing the pole pieces, a rotor associated with said pole pieces, and shading means for causing the magnetic flux in some of the pole pieces to lag behind the flux in other pole pieces, said shading means comprising a body of metal cast around some of the pole pieces whereby the same are embedded in said body.

3. An electric motor comprising a cup-shaped field member having pole pieces, a magnetizing coil mounted in said member for magnetizing said pole pieces and shading means comprising a body of metal cast around said cup-shaped member to cover the outer surface thereof and embed at least some of said pole pieces.

4. A device of the type described comprising an electric motor comprising a cup-shaped field member having pole pieces, a magnetizing coil mounted in said member for magnetizing said pole pieces and shading means comprising a body of metal cast around said cup-shaped member to cover the outer surface thereof and embed at least some of said pole pieces, said body of metal having an extension forming a gear housing, a gear train within said housing and driven by said motor.

5. An electric motor and gear train unit comprising pole pieces, means for magnetizing said pole pieces, a rotor associated with said pole pieces, a gear train driven by said rotor and a housing for said gear train, said housing having means integral therewith for shading certain of said pole pieces to cause the magnetic flux therein to lag behind the flux in other pole pieces.

6. An electric motor and gear train unit comprising pole pieces, means for magnetizing said pole pieces, a rotor associated with said pole pieces, a gear train driven by said rotor, a housing for said gear train and means carried by said housing for shading certain of said pole pieces to cause the magnetic flux therein to lag behind the flux in the other pole pieces.

7. An electric motor and gear train unit comprising pole pieces, means for magnetizing the same, a rotor associated with said pole pieces, a gear train driven by said rotor, and a member having a central portion forming a bearing support for said rotor and having two integral portions one of which forms a housing for the gear train and the other of which reinforces and shades certain of said pole pieces to cause the flux therein to lag behind the flux in other pole pieces.

8. An electric motor comprising a cup-shaped field member having marginal pole pieces, a disc-shaped field member having marginal pole pieces, a magnetizing coil mounted between said members to magnetize the pole pieces, and means for shading some of the pole pieces on said cup-shaped member, said means comprising a body of metal cast around the pole pieces on said member.

9. An electric motor comprising pole pieces, means for magnetizing the pole pieces, a rotor associated with said pole pieces, shading means for causing the magnetic flux in some of the pole pieces to lag behind the flux in other pole pieces, and a cap enclosing the rotor and mounted on said shading means.

ARTHUR WILLIAM HAYDON.